United States Patent
Goto et al.

[11] Patent Number: 5,965,478
[45] Date of Patent: *Oct. 12, 1999

[54] SOLID CATALYST COMPONENT AND CATALYST FOR POLYMERIZATION OF OLEFINS

[75] Inventors: Kenji Goto; Motoki Hosaka; Akira Saito; Tetsuo Ohtsuka, all of Kanagawa, Japan

[73] Assignee: Toho Titanium Co., Ltd., Chigasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,084
[22] PCT Filed: Feb. 9, 1996
[86] PCT No.: PCT/JP96/00293
§ 371 Date: Aug. 13, 1997
§ 102(e) Date: Aug. 13, 1997
[87] PCT Pub. No.: WO96/25439
PCT Pub. Date: Aug. 22, 1996

[30] Foreign Application Priority Data

Feb. 13, 1995 [JP] Japan ................... 7-049064

[51] Int. Cl.⁶ ............ B01J 31/00; B01J 37/00; C08F 4/02; C08F 4/60
[52] U.S. Cl. .......... 502/127; 502/107; 502/114; 502/115; 502/116; 502/125; 502/126; 502/132; 502/133; 526/125.3; 526/124.6; 526/128
[58] Field of Search ............. 502/110, 114, 502/115, 116, 125, 127, 132, 133, 126, 107

[56] References Cited

U.S. PATENT DOCUMENTS

| | | | |
|---|---|---|---|
| 4,451,688 | 5/1984 | Kuroda et al. | 502/125 |
| 4,547,476 | 10/1985 | Terano et al. | 502/125 |
| 4,565,798 | 1/1986 | Yamamoto et al. | 502/126 |
| 4,613,581 | 9/1986 | Maruyama et al. | 502/126 |
| 4,654,318 | 3/1987 | Yamamoto et al. | 502/133 |
| 4,816,433 | 3/1989 | Terano et al. | 502/127 |
| 4,829,037 | 5/1989 | Terano et al. | 502/127 |
| 4,847,227 | 7/1989 | Murai et al. | 502/127 |
| 4,874,737 | 10/1989 | Job | 502/125 |
| 4,900,706 | 2/1990 | Sasaki et al. | 502/116 |
| 4,940,682 | 7/1990 | Sasaki et al. | 502/126 |
| 4,983,561 | 1/1991 | Sasaki et al. | 502/126 |
| 4,990,479 | 2/1991 | Ishimaru et al. | 502/126 |
| 5,051,484 | 9/1991 | Sasaki et al. | 526/151 |
| 5,132,379 | 7/1992 | Chadwick et al. | 502/107 |
| 5,137,996 | 8/1992 | Bailly et al. | 502/127 |
| 5,308,818 | 5/1994 | Shamshoum et al. | 502/125 |
| 5,498,770 | 3/1996 | Hosaka et al. | 502/125 |
| 5,556,822 | 9/1996 | Jung et al. | 502/125 |
| 5,608,018 | 3/1997 | Ebara et al. | 502/116 |
| 5,684,173 | 11/1997 | Hosaka et al. | 502/125 |
| 5,710,229 | 1/1998 | Garoff et al. | 502/127 |
| 5,767,031 | 6/1998 | Shamshoum et al. | 502/133 |
| 5,773,537 | 6/1998 | Mueller et al. | 502/115 |
| 5,817,591 | 10/1998 | Shamshoum et al. | 502/127 |
| 5,849,655 | 12/1998 | Shamshoum et al. | 502/127 |

FOREIGN PATENT DOCUMENTS

| | | |
|---|---|---|
| 0 319 226 | 6/1989 | European Pat. Off. . |
| 60-139186 | 1/1987 | Japan . |
| 62-508 | 1/1987 | Japan . |
| 62-158704 | 7/1987 | Japan . |
| 61-142662 | 1/1988 | Japan . |
| 63-301 | 1/1988 | Japan . |
| 64-38409 | 2/1989 | Japan . |
| 1-98604 | 4/1989 | Japan . |
| 1-149807 | 6/1989 | Japan . |
| 62-309209 | 6/1989 | Japan . |
| 3-273009 | 12/1991 | Japan . |
| 6-287217 | 10/1994 | Japan . |
| 8-67711 | 3/1996 | Japan . |

*Primary Examiner*—Mark L. Bell
*Assistant Examiner*—J. Pasterczyk
*Attorney, Agent, or Firm*—Oblon, Spivak, McClelland, Maier & Neustadt, P.C.

[57] ABSTRACT

A solid catalyst component for polymerization of olefins prepared by reacting a titanium halide, a diester of aromatic dicarboxylic acid and a dialkoxymagnesium having a bulk density of at least 0.25 g/ml and an average particle size of 1 to 100 μm. The average rate of temperature rise from the temperature at which the titanium halide is allowed to come in contact with the dialkoxymagnesium to the temperature at which the reaction is initiated is in a range of from 0.5 to 20° C./min. Such catalyst can further comprise an organic aluminum compound and an organic silicon compound. The use of said catalyst makes it possible to efficiently obtain a polyolefin having a high stereoregularity, a high bulk density and excellent particle properties.

16 Claims, 1 Drawing Sheet

SOLID CATALYST COMPONENT AND CATALYST FOR POLYMERIZATION OF OLEFINS

TECHNICAL FIELD

The present invention relates to a solid catalyst component for polymerization of olefins and a catalyst for polymerization of olefins which can provide a polymer having a high stereoregularity and excellent particle properties, in particular a high bulk density, in a high yield in the polymerization of olefins. More particularly, the present invention relates to a solid catalyst component for polymerization of olefins and a catalyst for polymerization of olefins which can provide a copolymer having excellent particle properties in a high yield even if the production ratio of rubber-like polymer is raised in the block copolymerization of olefins.

TECHNICAL BACKGROUND

Many proposals have been made for a solid catalyst component for polymerization of olefins comprising magnesium, titanium, an electron donor compound and a halogen as essential components, a catalyst for polymerization of olefins comprising said solid catalyst component, an organic aluminum compound, an organic silicon compound, etc., and a process for the polymerization of olefins which comprises polymerizing or copolymerizing olefins in the presence of said catalyst.

For example, JP-A-63-3010 (The term "JP-A" as used herein means an "unexamined published Japanese patent application") proposes a catalyst for polymerization of olefins comprising a solid catalyst component prepared by a process which comprises allowing a dialkoxymagnesium, a diester of aromatic dicarboxylic acid, an aromatic hydrocarbon and a titanium halide to come in contact with one another, and then subjecting the product to heat treatment in powder form, an organic aluminum compound and an organic silicon compound, and a process for the polymerization of olefins.

Further, JP-A-1-315406 proposes a catalyst for polymerization of olefins comprising a solid catalyst component prepared by a process which comprises allowing a suspension of diethoxymagnesium in an alkylbenzene to come in contact with titanium tetrachloride, adding phthaloyl dichloride to the suspension for reaction to obtain a solid product, and then allowing the solid product to come in contact with titanium tetrachloride in the presence of an alkylbenzene, an organic aluminum compound and an organic silicon compound, and a process for the polymerization of olefins in the presence of said catalyst.

The foregoing various conventional techniques focus on the development of a catalyst component which is active enough to allow the omission of a so-called deashing step, i.e., step of removing catalyst residues such as chlorine and titanium remaining in the polymer produced as well as on the enhancement of the yield of stereoregular polymer and the maintenance of the catalytic activity during polymerization. These techniques can provide excellent results on these purposes. However, if a polymerization catalyst having a composition comprising this kind of a high activity type catalyst component, an organic aluminum compound and an electron donor compound such as a silicon compound is employed to polymerize olefins, the polymer thus produced contains much fine powder derived from fine solid catalyst component itself or obtained by fragmentation due to reaction heat developed during polymerization. Thus, the polymer tends to have a broad particle size distribution. If the content of the fine particle size polymer is raised, it causes the inhibition of the process. For example, the continuance of uniform reaction can be inhibited. Further, the pipe in the polymerization process can be blocked during the transfer of the polymer. In addition, if the particle size distribution is widened, it eventually gives undesirable effects on the molding of the polymer. This is the reason why a polymer having as small fine particle size polymer content as possible, a uniform particle size and a narrow particle size distribution has been desired.

In order to solve these problems, many methods have been proposed. For example, JP-A-6-157659 proposes a catalyst for polymerization of olefins made of a solid catalyst component obtained by a process which comprises adding a suspension of a spherical particulate dialkoxymagnesium, an aromatic hydrocarbon and a diester of phthalic acid to a mixed solution of an aromatic hydrocarbon and titanium tetrachloride so that they are reacted, and then reacting the reaction product with titanium tetrachloride.

For example, JP-A-6-287225 proposes a solid catalyst component for polymerization of olefins obtained by a process which comprises adding a suspension of a spherical particulate dialkoxymagnesium, an aromatic hydrocarbon and a diester of phthalic acid to a mixed solution of an aromatic hydrocarbon and titanium tetrachloride so that they are reacted, washing the reaction product with an aromatic hydrocarbon, and then again reacting the reaction product with titanium tetrachloride to obtain a solid component which is then dried and freed of fine powder.

Further, JP-A-6-287217 proposes a solid catalyst component for polymerization of olefins obtained by a process which comprises adding a suspension of a spherical particulate dialkoxymagnesium, an aromatic hydrocarbon and a diester of phthalic acid to a mixed solution of an aromatic hydrocarbon and titanium tetrachloride so that they are reacted, washing the reaction product with an aromatic hydrocarbon, again reacting the reaction product with titanium tetrachloride, drying the solid component thus obtained, removing fine powder from the solid component, and then adding a powdered nonionic surfactant to the solid component.

The foregoing technique can remove the fine powder derived from the solid catalyst component itself, eventually exerting an effect of reducing the content of fine powder in the polymer thus produced. However, the effect of the foregoing technique does not go so far as to control the generation of fine powder due to fragmentation of particles by the reaction heat developed during polymerization. Thus, a fine powder is still present in the polymer thus produced. Further, the polymer produced according to the foregoing techniques is nearly spherical and has a good morphology but has a low bulk density. In the production of a polyolefin, the amount of a polymer to be produced per unit volume in the polymerization tank is reduced, and the amount of the polymer to be processed during transportation or pelletizing step is limited. As a result, such a problem that the productivity throughout the entire process for the production of polyolefin is reduced is left unsolved.

On the other hand, a process for the production of a block copolymer of propylene has been known which comprises producing a crystalline polymer of propylene alone in the presence of a solid catalyst component or catalyst of the various conventional types at a first stage, and then copolymerizing propylene with another olefin such as ethylene and 1-butene in the copresence of said propylene homopolymer at a second stage. Such a block copolymer contains a rubber-like copolymer in a certain proportion in the composition and thus exhibits an enhanced impact strength while maintaining an excellent rigidity characteristic of crystalline polypropylene. Therefore, such a block copolymer has found wide application, e.g., to container, automobile parts such as bumper, household appliance, furniture.

In order to further enhance the impact strength of such a block copolymer, the proportion of a rubber-like copolymer (e.g., ethylene-propylene rubber) to be produced in the block copolymer needs to be raised. However, as the production ratio of rubber-like copolymer increases, the stickiness of the particulate block copolymer thus produced increases. As a result, the flowability of the particulate polymer thus produced shows a remarkable deterioration in the gas phase polymerization process or bulk polymerization process. Further, the polymer particles stick to each other to agglomerate or stick to the inner wall of the polymerization apparatus, causing serious troubles in the process operation.

For the purpose of eliminating these difficulties, JP-A-61-69821 and JP-A-61-69822 propose the supply of an active hydrogen compound such as ethanol or an oxygen-containing compound such as oxygen gas into the polymerization system at the second stage, i.e., stage of producing a rubber-like copolymer. However, such an active hydrogen compound or oxygen-containing compound originally causes deterioration of the activity of the catalyst in the polymerization of olefins. In this process, the amount of such an active hydrogen compound or oxygen-containing compound to be supplied needs to be closely controlled. Further, the apparatus to be used for this process needs to be improved.

The inventors made studies of the solution to the foregoing problems of the prior art techniques. As a result, it was found that these problems can be effectively solved by the polymerization or copolymerization of olefins in the presence of a solid catalyst component prepared from a dialkoxymagnesium having a bulk density of at least a predetermined value, or a catalyst comprising the solid catalyst component, a specific organic silicon compound and a specific organic aluminum compound. Thus, the present invention has been worked out.

It is therefore an object of the present invention to provide a solid catalyst component and catalyst for polymerization of olefins which can provide a polymer having a high bulk density and a small content of fine powder while maintaining the desired high polymerization activity and high yield of a high stereoregularity polymer. It is another object of the present invention to provide a solid catalyst component and catalyst for polymerization of olefins which can maintain its good particle properties even if the production ratio of rubber-like copolymer is raised in block copolymerization.

DISCLOSURE OF THE INVENTION

The solid catalyst component (A) (hereinafter occasionally referred to as "component (A)") for polymerization of olefins of the present invention for accomplishing the foregoing objects is characterized in that it is prepared by allowing the following components (a), (b) and (c) to come in contact with one another:
(a) An alkoxymagnesium having a bulk density of at least 0.25 g/ml;
(b) A titanium halide represented by the general formula:

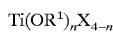

wherein $R^1$ represents a $C_{1-4}$ alkyl group; X represents a chlorine, bromine or iodine atom; and n represents 0 or an integer of from 1 to 3); and
(c) A diester of aromatic dicarboxylic acid The catalyst for polymerization of olefins of the present invention is also characterized in that it comprises the foregoing solid catalyst component (A), and the following components (B) and (C):
(B) One or more organic aluminum compounds [hereinafter simply referred to as "component (B)"] represented by the general formula:

wherein $R^2$ represents a $C_{1-4}$ alkyl group; Q represents a hydrogen, chlorine, bromine or iodine atom; and x represents a real number of from more than 0 to not more than 3, with the proviso that the plurality of $R^2$'s and Q's may be the same or different, respectively; and
(C) One or more organic silicon compounds [hereinafter simply referred to as "component (C)"] represented by the general formula:

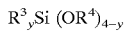

wherein $R^3$'s, which may be the same or different, each represents an alkyl group, a cycloalkyl group or a derivative thereof, a phenyl group, a vinyl group, an allyl group or an aralkyl group; $R^4$'s, which may be the same or different, each represents a $C_{1-4}$ alkyl, cycloalkyl, phenyl, vinyl, allyl or aralkyl group; and y represents 0 or an integer of from 1 to 3, with the proviso that the plurality of $R^3$'s and $R^4$'s may be the same or different.

The present invention will be further described hereinafter.

Examples of the dialkoxymagnesium as component (a) (hereinafter occasionally referred to as "component (a)") to be used in the production of the solid catalyst component (A) of the present invention include dimethoxymagnesium, diethoxymagnesium, di-n-propoxymagnesium, di-iso-propoxymagnesium, di-n-butoxymagnesium, di-iso-butoxymagnesium, ethoxymethoxymagnesium, ethoxy-n-propoxymagnesium, n-butoxyethoxymagnesium, and iso-butoxyethoxymagnesium. These dialkoxymagnesiums may be used singly or in combination of two or more of them. Particularly preferred among these dialkoxymagnesiums is diethoxymagnesium or di-n-propoxymagnesium.

It is essentially required that the foregoing component (a) be in powder form and have a bulk density of at least 0.25 g/ml, preferably from 0.25 to 0.40 g/ml, more preferably from 0.27 to 0.37 g/ml. If the bulk density of the component (a) falls below 0.25 g/ml, a polyolefin having a high bulk density and a high stereoregularity cannot be obtained in a high yield. On the contrary, if the bulk density of the component (a) is too high, it exerts an undesirable effect on the particle properties of the resulting polyolefin. The bulk density of the polyolefin is determined according to JIS K6721 (1977).

The pore volume of the component (a) is preferably at least 0.02 ml/g, more preferably from 0.02 to 0.06 ml/g, even more preferably from 0.02 to 0.05 ml/g. If a solid catalyst component prepared from a porous dialkoxymagnesium having a relatively great pore volume is employed to polymerize olefins, a polymer having a high stereoregularity and excellent particle properties can be obtained in a high yield. Further, a copolymer having excellent particle properties can be obtained in a high yield even if the production ratio of rubber-like polymer is raised in the block copolymerization. The pore volume of the component (a) is determined by a nitrogen gas adsorption isotherm method.

Thus, it is necessary that the dialkoxymgnesium as component (a) have a high bulk density. Further, a dialkoxymagnesium having a pore volume of at least a predetermined value is preferably used. These physical properties can effectively work to exert an effect of producing a high bulk density and high stereoregularity polyolefin in a high yield as well as maintaining the desired particle properties even if the production ratio of rubber-like copolymer is raised in the block copolymerization.

Besides the foregoing characteristics, the dialkoxymagnesium as component (a) constituting the solid catalyst component of the present invention preferably has the following characteristics.

The pore volume distribution of the dialkoxymagnesium, if represented by $\ln(R_{90}/R_{10})$ (in which $R_{90}$ is the pore radius determined when the cumulative pore volume reaches 90%, and $R_{10}$ is the pore radius determined when the cumulative pore volume reaches 10%), is at least 1.5, preferably from 1.5 to 3.5, more preferably from 2.0 to 3.0. Thus, a dialkoxymagnesium having such a relatively wide pore volume distribution is desirable. The pore volume distribution of the dialkoxymagnesium is determined by a nitrogen gas adsorption isotherm method.

The dialkoxymagnesium to be used herein desirably has a nitrogen adsorption specific surface area ($N_2SA$) of from 5 to 50 $m^2/g$, preferably from 10 to 40 $m^2/g$, more preferably from 15 to 30 $m^2/g$. The dialkoxymagnesium to be used is more preferably spherical or ellipsoidal. Further, the dialkoxymagnesium to be used herein more preferably has a narrow particle size distribution. The term "spherical or ellipsoidal" as used herein is meant to indicate a spherical or ellipsoidal particle having a sphericity coefficient of not more than 3, preferably from 1 to 2, more preferably from 1 to 1.5, as calculated in terms of ratio of major axis length l to minor axis length w (l/w), the surface of which does not necessarily need to be smooth as observed under microscope. Accordingly, a dialkoxymagnesium having a roughened surface such as in potato-like form may be used. Thus, the solid catalyst component prepared from such a spherical or ellipsoidal dialkoxymagnesium, too, is spherical or ellipsoidal. Further, the polyolefin prepared using such a spherical or ellipsoidal solid catalyst component, too, is spherical or ellipsoidal. Eventually, a polymer having an extremely excellent flowability can be obtained. This merits the process for the production of polyolefin.

The foregoing dialkoxymagnesium has an average particle size of from 1 µm to 100 µm, preferably from 5 µm to 80 µm, more preferably from 10 µm to 60 µm. Further, referring to its particle size distribution, the foregoing dialkoxymagnesium preferably has a sharp particle size distribution comprising less fine or coarse powder. In some detail, the particle size distribution comprises particles having a particle size of not more than 5 µm in an amount of not more than 20% by weight, preferably not more than 15% by weight, more preferably not more than 10% by weight, and particles having a particle size of at least 100 µm in an amount of not more than 10% by weight, more preferably not more than 5% by weight. The particle size distribution is not more than 3, preferably not more than 2.5, more preferably not more than 2, as calculated in terms of $(D_{90}-D_{10})/D_{50}$ (wherein $D_{90}$ represents the particle size at the point where the cumulative particle size reaches 90%, $D_{10}$ represents the particle size at the point where the cumulative particle size reaches 10%, and $D_{50}$ represents the particle size at the point where the cumulative particle size reaches 50%). The use of such a dialkoxymagnesium having a small content of fine powder eventually makes it possible to reduce the content of fine powder in the resulting polyolefin.

The foregoing spherical or ellipsoidal dialkoxymagnesium having a high bulk density, a pore volume of at least a predetermined value and a small content of fine powder and coarse powder can be obtained, e.g., by the following method.

In a process which comprises allowing metallic magnesium and one or more alcohols represented by the general formula $R^5OH$ (in which $R^5$ represents a $C_{1-4}$ straight-chain or branched-chain alkyl group) to undergo direct reaction free from solvent in the presence of a catalyst to prepare a dialkoxymagnesium, the improvement comprising the steps of:

(i) supplying metallic magnesium and an alcohol into the reaction system in a final metallic magnesium/alcohol proportion (by weight) of from 1/9 to 15;

(ii) continuously or intermittently adding said metallic magnesium and alcohol in said final proportion to the reaction system under reflux of alcohol so that they are reacted for 5 to 80 minutes; and (iii) keeping the resulting reaction product under reflux of alcohol for 1 to 30 hours to effect ripening reaction.

The metallic magnesium to be used in the foregoing process is preferably one in the form of powder having a particle size of scores to hundreds of mesh, particularly about 100 mesh, and a good reactivity.

Examples of the foregoing catalyst employable herein include halogenated alkyl such as methyl bromide, methyl chloride, ethyl bromide and ethyl chloride, metallic halide such as magnesium chloride and aluminum chloride, dialkoxymagnesium such as diethoxymagnesium, iodine, and ester of acetic acid.

The titanium halide as component (b) to be used in the preparation of the solid catalyst component (A) of the present invention (hereinafter occasionally referred to as "component (b)") comprises one or more titanium halides or alkoxytitanium halides represented by the general formula $Ti(OR^1)_nX_{4-n}$ (wherein $R^1$ represents a $C_{1-4}$ straight-chain or branched-chain alkyl group; X represents a chlorine, bromine or iodine atom; and n represents 0 or an integer of from 1 to 3, with the proviso that the plurality of $R^1$'s and X's may be the same or different).

Specific examples of the titanium tetrahalide include $TiCl_4$, $TiBr_4$, and $TiI_4$. Specific examples of the alkoxytitanium halide include $Ti(OCH_3)Cl_3$, $Ti(OC_2H_5)Cl_3$, $Ti(OC_3H_7)Cl_3$, $Ti(O-(n)C_4H_9)Cl_3$, $Ti(OCH_3)_2Cl_2$, $Ti(OC_2H_5)_2Cl_2$, $Ti(OC_3H_7)_2Cl_2$, $Ti(O(n))$ $C_4H_9)_2Cl_2$, $Ti(OCH_3)_3Cl$, $Ti(OC_2H_5)_3Cl$, $Ti(OC_3H_7)_3Cl$, and $Ti(O(n))$ $C_4H_9)_3Cl$. Preferred among these titanium halides is titanium tetrahalide. Particularly preferred is $TiCl_4$. These titanium halides may be used singly or in combination of two or more of them.

As the halide other than the titanium halide as component (b) there may be used a halogenated silicon compound such as silicon tetrachloride or thionyl chloride in combination with the component (b). The component (b) may be diluted with an inert organic solvent such as aromatic hydrocarbon or aliphatic hydrocarbon (e.g., hexane, heptane) before use.

As the diester(s) of aromatic dicarboxylic acid to be used as component (c) in the preparation of the solid catalyst component (A) of the present invention (hereinafter occasionally referred to as "component (c)") there may be used one or more diesters of phthalic acid or diesters of terephthalic acid.

Specific examples of such a diester of phthalic acid include dimethyl phthalate, diethyl phthalate, di-n-propyl phthalate, di-iso-propyl phthalate, di-n-butyl phthalate, di-iso-butyl phthalate, ethylmethyl phthalate, methyl(iso-propyl) phthalate, ethyl-n-propyl phthalate, n-butyl-ethyl phthalate, iso-butyl-ethyl phthalate, di-n-pentyl phthalate, di-iso-pentyl phthalate, dihexyl phthalate, di-n-hepthyl phthalate, di-n-octyl phthalate, bis(2-methylhexyl) phthalate, bis(2-ethylhexyl) phthalate, di-n-nonyl phthalate, di-iso-decyl phthalate, bis(2,2-dimethylheptyl) phthalate, n-butyl(iso-hexyl) phthalate, n-butyl(iso-octyl) phthalate, n-pentylhexyl phthalate, n-pentyl(iso-hexyl) phthalate, iso-pentyl(heptyl) phthalate, n-pentyl(iso-octyl) phthalate, n-pentyl(iso-nonyl) phthalate, iso-pentyl(n-decyl) phthalate, n-pentyl(undecyl) phthalate, iso-pentyn(iso-hexyl) phthalate, n-hexyl(iso-octyl) phthalate, n-hexyl(iso-nonyl) phthalate, n-hexyl(n-decyl) phthalate, n-heptyl(iso-octyl) phthalate, n-heptyl(iso-nonyl) phthalate, n-heptyl(neo-decyl) phthalate, and iso-octyl(iso-nonyl) phthalate. These phthalic acid esters may be used singly or in combination of two or more of them.

Specific examples of the diester of terephthalic acid include dimethyl terephthalate, diethyl terephthalate, di-n-propyl terephthalate, di-iso-propyl terephthalate, di-n-butyl terephthalate, di-iso-butyl terephthalate, ethylmethyl terephthalate, methyl(iso-propyl) terephthalate, ethyl-n-propyl terephthalate, n-butylethyl terephthalate, iso-butylethyl terephthalate, di-n-pentyl terephthalate, di-iso-pentyl terephthalate, dihexyl terephthalate, di-n-heptyl terephthalate, di-n-octyl terephthalate, bis(2-methylhexyl) terephthalate, bis(2-ethylhexyl) terephthalate, di-n-nonyl terephthalate, di-iso-decyl terephthalate, bis(2,2-dimethylheptyl) terephthalate, n-butyl(iso-hexyl) terephthalate, n-butyl(iso-octyl) terephthalate, n-pentylhexyl terephthalate, n-pentyl(iso-hexyl) terephthalate, iso-pentyl(heptyl) terephthalate, n-pentyl(iso-octyl) terephthalate, n-pentyl(iso-nonyl) terephthalate, iso-pentyl(n-decyl) terephthalate, n-pentyl(undecyl) terephthalate, iso-pentyl(iso-hexyl) terephthalate, n-hexyl(iso-octyl) terephthalate, n-hexyl(iso-nonyl) terephthalate, n-hexyl(n-decyl) terephthalate, n-heptyl(iso-octyl) terephthalate, n-heptyl(iso-nonyl) terephthalate, n-heptyl(neo-decyl) terephthalate, and iso-octyl(iso-nonyl) terephthalate. These diesters of terephthalic acid may be used singly or in combination of two or more of them.

If one of the foregoing diesters of phthalic acid is used, diethyl phthalate, di-n-propyl phthalate, di-iso-propyl phthalate, di-n-butyl phthalate, di-iso-butyl phthalate, di-n-octyl phthalate, bis(2-ethylhexyl) phthalate and di-iso-decyl phthalate are preferably used.

If two or more of these components (c) are used in combination, they are preferably used in such a combination that the difference between the sum of the number of carbon atoms in the alkyl groups in one diester of phthalic acid and the sum of the number of carbon atoms in the alkyl groups in another diester of phthalic acid is at least 4, though not specifically limited. Specific examples of such a combination will be given below.

(1) Diethyl phthalate, di-n-butyl phthalate
(2) Diethyl phthalate, di-iso-butyl phthalate
(3) Diethyl phthalate, di-n-octyl phthalate
(4) Diethyl phthalate, bis(2-ethylhexyl) phthalate
(5) Di-n-butyl phthalate, di-n-octyl phthalate
(6) Di-n-butyl phthalate, bis(2-ethylhexyl) phthalate
(7) Diethyl phthalate, di-n-butyl phthalate, bis(2-ethylhexyl) phthalate
(8) Diethyl phthalate, di-iso-butyl phthalate, bis(2-ethylhexyl) phthalate As mentioned above, the polymerization of olefins, particularly propylene, in the presence of a solid catalyst component prepared from two or more components (c) makes it possible to obtain a polymer having an even higher crystallizability and a wide molecular weight distribution.

In the preparation of the solid catalyst component (A), the foregoing diester of phthalic acid as an essential component may be used in combination with other electron donor compounds. As such an electron donor compound there may be used an organic compound containing oxygen or nitrogen. Examples of such an organic compound include alcohols, phenols, ethers, esters, ketones, acid halides, aldehydes, amines, amides, nitriles, isocyanates, and an organic silicon compound containing Si—O—C bond.

Specific examples of these electron donor compounds include alcohols such as methanol, ethanol, propanol, butanol, pentanol, hexanol, octanol, 2-ethylhexanol and dodecanol, phenols such as phenol and cresol, ethers such as methyl ether, ethyl ether, propyl ether, butyl ether, amyl ether and diphenyl ether, esters of monocarboxylic acid such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, methyl anisate and ethyl anisate, diesters of dicarboxylic acid such as diethyl maleate, dibutyl maleate, dimethyl adipate, diethyl adipate, dipropyl adipate, dibutyl adipate, diisodecyl adipate and dioctyl adipate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, and nitriles such as acetonitrile, benzonitrile and trinitrile.

Specific examples of the organic silicon compound containing Si—O—C bond include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopentylethyldiethoxysilane, cyclopentyl(iso-propyl)dimethoxysilane, cyclohexyl(n-pentyl)dimethoxysilane, cyclopentyl(iso-butyl)dimethoxysilane, cyclohexylcyclopentyldimethoxysilane, cyclohexylcyclopentyldiethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, cyclohexyl(n-pentyl)diethoxysilane, cyclopentylethyldimethoxysilane, cyclopentylmethyldiethoxysilane, cyclohexyl(n-propyl) dimethoxysilane, cyclohexyl(n-butyl)dimethoxysilane, cyclohexyl(n-propyl)diethoxysilane, cyclohexyl(n-butyl) diethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, phenyltrimethoxysilane, phenyltriethoxysilane, tetramethoxysilane, and tetraethoxysilane.

The foregoing components (a), (b) and (c) are allowed to come in contact with one another in a suspension of an aromatic hydrocarbon which stays liquid at ordinary temperature (hereinafter occasionally referred to as "component (d)"). As the component (d) there may be used benzene, toluene, xylene, ethylbenzene, propylbenzene, trimethylbenzene or the like. Preferred among these compounds is toluene or xylene.

The order of addition of the foregoing components (a), (b) and (c) in the process for the preparation of the solid catalyst component (A) of the present invention will be described hereinafter. The order of addition of the foregoing components (a), (b) and (c) is not specifically limited but is arbitrary. In a preferred embodiment of the present invention, the preparation process comprises suspending the component (a) in the component (d) (step 1), allowing the suspension to come in contact with the component (b) (step 2), allowing the component (c) to come in contact with the component (a) or (b) at either the step 1 or 2 or after the step 2, and then allowing the component (b) to come in contact and react with the solid product obtained after the foregoing steps twice or more times to obtain a solid catalyst component (A). This order of contact makes it possible to further enhance the catalytic activity. In this procedure, the reaction is preferably effected in the presence of the component (d). Further, the second and subsequent contact or reaction of the component (b) is preferably preceded by one or more washes of the solid product with the component (d).

The component (c) may be added at the step 1 of suspending the component (a) in the component (d) or at the step 2 of allowing the component (b) to come in contact with the suspension of the component (a) in the component (d) as mentioned above. Alternatively, the component (c) may be separately added at both the step 1 and the step 2. Further, the component (c) may be again added at the step of repeating the contact or reaction with the component (b) twice or more times after being allowed to come in contact with the component(s) at either the step 1 or the step 2 as mentioned above.

Specific examples of the order of addition of these substances will be given below.
1. (a)+(c)+(d)→(b)
2. (a)+(c)+(d)→(b)→(b)
3. (a)+(c)+(d)→(b)→(b)+(d)
4. (a)+(c)+(d)→(b)→(d) (wash)→(b)+(d)
5. (a)+(c)+(d)→(b)→(d) (wash)→(b)+(d)→(b)+(d)
6. (a)+(c)+(d)→(b)→(d) (wash)→(b)+(c)+(d)
7. (a)+(c)+(d)→(b)→(d) (wash)→(b)+(c)+(d)→(b)+(d)
8. (a)+(d)→(b)+(c)
9. (a)+(d)→(b)→(c)
10. (a)+(d)→(b)→(c)→(b)
11. (a)+(d)→(b)→(c)→(b)+(d)
12. (a)+(d)→(b)→(c)→(d) (wash)→(b)+(d)
13. (a)+(d)→(b)→(c)→(d) (wash)→(b)+(d)→(b)+(d)
14. (a)+(d)→(b)→(c)→(d) (wash)→(b)+(c)+(d)
15. (a)+(d)→(b) (c)→(d) (wash)→(b)+(c)+(d)→(b)+(d)

In a preferred embodiment of the present invention, the solid product obtained by the contact of these components is thoroughly washed with an aliphatic hydrocarbon solvent such as n-heptane and n-hexane.

The temperature at which the component (a) is suspended in the component (d) in the contact or reaction of the foregoing components is not specifically limited. In practice, however, the suspension is preferably effected within a temperature range of not higher than 40° C. with stirring for 1 minute to 5 hours, if possible.

Subsequently, the component (b) is allowed to come in contact with the suspension of the component (a) in the component (d). The temperature at which this contact is effected may be the same or different from the temperature at which the component (a) is suspended in the component (d). It is preferably predetermined to not higher than 40° C., more preferably not higher than 20° C., most suitably from −10° C. to 15° C. The process for the contact of the suspension of the component (a) in the component (d) with the component (b) is not specifically limited. In practice, however, the contact of these components can be accomplished by a process which comprises adding dropwise the component (b) to the suspension of the component (a) in the component (d), a process which comprises adding dropwise the suspension of the component (a) in the component (d) to the component (b) or a process which comprises adding dropwise the suspension of the component (a) in the component (d) to the component (b) diluted with the component (d).

As mentioned above, the component (b) is allowed to come in contact with the suspension of the component (a) in the component (d) before the reaction. The reaction temperature is from 0° C. to 130° C., preferably from 40° C. to 130° C., particularly from 70° C. to 120° C. The reaction time is not specifically limited. In general, however, the reaction time is from 10 minutes to 5 hours, preferably from 30 minutes to 3 hours.

In the case where the solid catalyst component of the present invention is prepared, the average rate of temperature rise from the temperature at which the component (b) is allowed to come in contact with the suspension of the component (a) in the component (d) to the temperature at which the reaction is initiated is preferably predetermined to a range of from 0.5 to 20° C./min., more preferably from 0.7 to 10° C./min., particularly from 0.8 to 8° C./min. If the rate of temperature rise is too low, the dialkoxymagnesium as a raw material cannot sufficiently exert its effect, and the polymer produced in the presence of the solid catalyst component thus obtained exhibits an insufficient bulk density. On the contrary, if the rate of heat rise is too high, the resulting reaction heat is so high as to destroy the particles. As a result, the solid catalyst component thus prepared has an increased content of fine powder.

The temperature at which the contact of the component (c) is effected is not specifically limited. In practice, however, the component (c) is added and allowed to come in contact with the resulting reaction product within a temperature range of from −10° C. to 130° C., preferably from 0° C. to 100° C., particularly from 5° C. to 40° C. Also in the case where two or more components (c) are used in combination, or one component (c) is separately added as previously mentioned, the component (c) is added and allowed to come in contact with the resulting reaction product within the same temperature range as above. These components (c) may be added at the same or different temperatures. In order to sufficiently disperse the component (c) in the suspension during the contact so that the component (c) is allowed to come in uniform contact with the solid material in the suspension, the suspension may be sufficiently stirred so that it is preferably in a turbulence zone to which the component (c) is added.

The proportion of the components (a), (b), (c) and (d) to be used depend on the preparation process and thus cannot be absolutely defined. In practice, however, the ratio of the component (d) to the component (b) by volume is from 0.1 to 20, preferably from 1 to 10, and the amount of the component (b) to be used is from 0.5 to 100 mols, preferably from 1 to 10 mols per mol of the component (a).

If a diester of phthalic acid is used as the component (c), the amount of the component (c) to be used is normally at least 0.05 mol, preferably from 0.1 to 1 mol per mol of the component (a), when the sum of the number of carbon atoms in the alkyl group(s) contained therein is from 2 to 10, or normally at least 0.05 mol, preferably from 0.05 to 1 mol, more preferably from 0.1 to 0.5 mol per mol of the component (a), when the sum of the number of carbon atoms in the alkyl group(s) contained therein is from 11 to 22. If two or more components (c) are used in combination, or one component (c) is separately added, the proportion of the components (c) is predetermined such that the sum of the added amount thereof is as defined above.

If the proportion of the component (c) falls below 0.05 mol per mol of the component (a), the production of particulate solid catalyst component is insufficient, reducing the bulk density of the solid catalyst component. The polymer produced in the presence of the solid catalyst component has an insufficiently raised bulk density and a reduced stereoregularity. Further, the yield of the polymer (catalytic activity) is lowered.

On the other hand, the proportion of the component (c) to be used or the proportion (content) of the component (c) in the solid catalyst component affects the crystallizability or density of the polymer of olefins, in particular propylene, prepared in the presence of the solid catalyst component. Accordingly, the density of the polymer can be controlled by changing the proportion or content of the component (c) to be used. In particular, in order to obtain a low density propylene polymer, it is preferred that a diester of phthalic acid having a total of from 10 to 22 carbon atoms in its alkyl groups be used in the above defined proportion.

In the preparation of the solid catalyst component (A) of the present invention, the compounds belonging to groups I to IV of the periodic table may be used as other components besides the foregoing components (a), (b), (c) and (d). Specific examples of these compounds include sodium chloride, magnesium chloride, aluminum chloride, potassium chloride, calcium chloride, zirconium chloride, hafnium chloride, sodium carbonate, magnesium carbonate, calcium carbonate, ethoxydichloroaluminum, diisopropoxyaluminum, isopropoxychloroaluminum, triethoxyaluminum, and triisopropoxyaluminum.

The addition of aluminum chloride, ethoxydichloroaluminum, diisopropoxyaluminum, isopropoxychloroaluminum, triethoxyaluminum or triisopropoxyaluminum among the foregoing compounds at any time during the preparation of the solid catalyst component (A) makes it possible to control the density of the polymer produced in the presence of the solid catalyst component. In particular, the polymerization of propylene in the presence of a solid catalyst component prepared by the addition of the foregoing aluminum compound makes it possible to control the density of the polymer thus produced to a relatively low range of from 0.900 to 0.907 g/ml. Further, the slurry process polymerization of propylene in the presence of the solid catalyst component makes it possible to obtain such a polymer having a low density and an extremely low reactor diluent soluble content (atactic polypropylene) in a high yield.

The solid catalyst component (A) obtained according to the foregoing process forms a catalyst for polymerization of olefins with an organic aluminum compound component (B) and an organic silicon compound component (C). The polymerization of olefins in the presence of the catalyst thus produced makes it possible to obtain a polymer powder having a high bulk density, a good particle shape and a sharp particle size distribution. As a result, the operability of the produced polymer powder during polymerization can be enhanced, eliminating troubles such as blocking caused by fine powder contained in the produced polymer powder.

As the organic aluminum compound (B) to be used in the production of the catalyst for polymerization of olefins of the present invention there may be used a compound represented by the general formula:

$$R^2_x AlY_{3-x}$$

wherein $R^2$ represents a $C_{1-4}$ straight-chain or branched-chain alkyl group; Q represents a hydrogen, chlorine, bromine or iodine atom; and x represents a real number of more than 0 to not more than 3, with the proviso that the plurality of $R^2$'s and Y's may be the same or different.

Examples of the organic aluminum compound (B) employable herein include triethylaluminum, diethylaluminum chloride, tri-iso-butylaluminum, diethylaluminum bromide, and ethylaluminum hydride. These organic aluminum compounds may be used singly or in combination of two or more of them. Preferred among these organic aluminum compounds are triethylaluminum, and tri-iso-butylaluminum.

As the organic silicon compound (C) to be used in the production of the catalyst for polymerization of olefins of the present invention there may be used an organic silicon compound represented by the general formula:

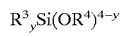

$$R^3_y Si(OR^4)_{4-y}$$

wherein $R^3$ s, which may be the same or different, each represents a preferably $C_{1-12}$ straight-chain or branched-chain alkyl group, a preferably $C_{3-6}$ cycloalkyl group and a derivative thereof, a phenyl group, a vinyl group, an allyl group or an aralkyl group; $R^4$'s, which may be the same or different, each represents a $C_{1-4}$ straight-chain or branched-chain alkyl, preferably $C_{3-6}$ cycloalkyl, phenyl, vinyl, allyl or aralkyl group; and y represents 0 or an integer of from 1 to 3, with the proviso that the plurality of $R^3$'s and $R^4$'s may be the same or different, respectively. Examples of the organic silicon compound include phenylalkoxysilane, alkylalkoxysilane, phenylalkylalkoxysilane, cycloalkylalkoxysilane, cycloalkylalkylalkoxysilane, and alkoxysilane.

Specific examples of the organic silicon compound (C) include trimethylmethoxysilane, trimethylethoxysilane, trin-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl) dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopenthylmethyldiethoxysilane, cyclopentylethyldiethoxysilane, cyclopentyl(iso-propyl)dimethoxysilane, cyclohexyl(n-pentyl)dimethoxysilane, cyclopentyl(n-pentyl)diethoxysilane, cyclopentyl(iso-butyl)dimethoxysilane, cyclohexyl(n-propyl)dimethoxysilane, cyclohexyl(n-propyl)diethoxysilane, cyclohexyl(iso-propyl) diethoxysilane, cyclohexyl(n-butyl)dimethoxysilane, cyclohexyl(n-butyl)diethoxysilane, cyclohexyl(iso-butyl) dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldiemethoxysilane, 4-methylcyclohexylcyclopentyldimethoxysilane, 3,5-dimethylcyclohexylcyclopentyldimethoxysilane, 3-methylcyclohexylcyclohexyldimethoxysilane, bis(3-methylcyclohexyl)dimethoxysilane, 4-methylcyclohexylcyclohexyldimethoxysilane, bis(4-methylcyclohexyl)dimethoxysilane, 3,5-dimethoxycyclohexylcyclohexyldimethoxysilane, and bis(3,5-dimethylcyclohexyl)dimethoxysilane.

Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysialne, cyclopentylethyldiethoxysilane, cyclohexylcyclopentyldimethoxysilane, cyclohexylcyclopentyldiethoxysilane, 3-methylcyclohexylcyclopentyldiemethoxysilane, 4-methylcyclohexylcyclopentyldimethoxysilane, and 3,5-dimethylcyclohexylcyclopentyldimethoxysilane. These compounds may be used singly or in combination of two or more of them.

The catalyst for polymerization of olefins of the present invention is prepared from the foregoing three components (A) to (C). As the electron donor (external electron donor) to be used during polymerization there may be used an organic compound containing oxygen or nitrogen in combination with the foregoing organic silicon compound (C). Specific examples of such an organic compound include alcohols, phenols, ethers, esters, ketones, acid halides, aldehydes, amines, amides, nitriles, and isocyanates.

Specific examples of these organic compounds include alcohols such as methanol, ethanol, propanol, butanol, pentanol, hexanol, octanol, 2-ethylhexanol and dodecanol, phenols such as phenol and cresol, ethers such as dimethyl ether, diethyl ether, dipropyl ether, dibutyl ether, diamyl ether and diphenyl ether, esters of monocarboxylic acid such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, p-methoxyethyl benzoate, p-ethoxyethyl benzoate, methyl anisate and ethyl anisate, esters of dicarboxylic acid such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate and didecyl phthalate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, and nitriles such as acetonitrile, benzonitrile and tolunitrile.

The polymerization of olefins can be accomplished by the homopolymerization or copolymerization of olefin monomers in the presence of a catalyst comprising the foregoing solid catalyst component (A), organic aluminum compound (B) and organic silicon compound (C). The proportion of these components to be used is arbitrary and not specifically limited unless it affects the effect of the present invention. In practice, however, the proportion of the organic aluminum compound (B) to be used is from 1 to 500 mols per mol of titanium atom in the solid catalyst component (A), and the proportion of the organic silicon compound (C) to be used is from 0.001 to 0.5 mol per mol of the component (B).

The polymerization can be effected in the presence or absence of organic solvent. The olefin monomers may be used in the form of gas or liquid. The polymerization temperature is not higher than 200° C., preferably not higher than 100° C. The polymerization pressure is not higher than 10 MPa, preferably not higher than 5 MPa. Either continuous polymerization process or batchwise polymerization process can be effected. Further, the polymerization reaction may be effected by one stage or by two or more stages.

Examples of the olefins to be homopolymerized or copolymerized in the presence of the catalyst of the present invention include ethylene, propylene, 1-butene, 1-pentene, 4-methyl-1-pentene, and vinyl cyclohexane. These olefins may be used singly or in combination of two or more of them. The homopolymerization of propylene or copolymerization of propylene with ethylene in the presence of the catalyst according to the present invention makes it possible to obtain an olefin polymer having a high stereoregularity and excellent particle properties in a high yield. Further, a copolymer having excellent particle properties can be obtained in a high yield even if the production ratio of rubber-like polymer is raised in the block copolymerization of olefins.

The polymerization of olefins in the presence of the catalyst made of the foregoing solid catalyst component (A), organic aluminum compound (B) and organic silicon compound (C) is preferably preceded by prepolymerization to further enhance the catalytic activity and the stereoregularity, particle properties of the polymer thus produced and the like. As the monomers to be used in the prepolymerization there may be used ethylene and propylene as well as monomers such as styrene and vinylcyclohexane.

The solid catalyst component (A) for polymerization of olefins of the present invention is mainly characterized by the selective use of a dialkoxymagnesium [component (a)] having a bulk density of at least 0.25 g/ml. More preferably, the solid catalyst component (A) is prepared by a process which comprises selecting a component (a) having a pore volume of at least 0.02 ml/g, a great specific surface area ($N_2SA$), a proper sphericity and average particle size, a sharp particle size distribution, i.e., small content of fine powder and coarse powder, and a relatively wide pore volume distribution, and then allowing the component (a) to come in contact with a titanium halide as a component (b) and a diester of aromatic dicarboxylic acid as a component (c) at ordinary temperature in a suspension of liquid aromatic hydrocarbon. When used in the polymerization of olefins, the solid catalyst component (A) thus prepared can act with a high activity to make an efficient production of a polymer having a high stereoregularity, excellent particle properties and a high bulk density.

The catalyst for polymerization of olefins of the present invention is prepared from the foregoing solid catalyst component (A), organic aluminum compound (B) and specific organic silicon compound (C). In the polymerization process, the solid catalyst component (A) exerts the foregoing effects in combination with the action by the foregoing components (B) and (C) to obtain excellent polymer properties. Thus, a copolymer having excellent particle properties can be obtained in a high yield even if the production ratio of rubber-like polymer is raised in the block copolymerization.

EMBODIMENT FOR IMPLEMENTING THE INVENTION

Figure 1:
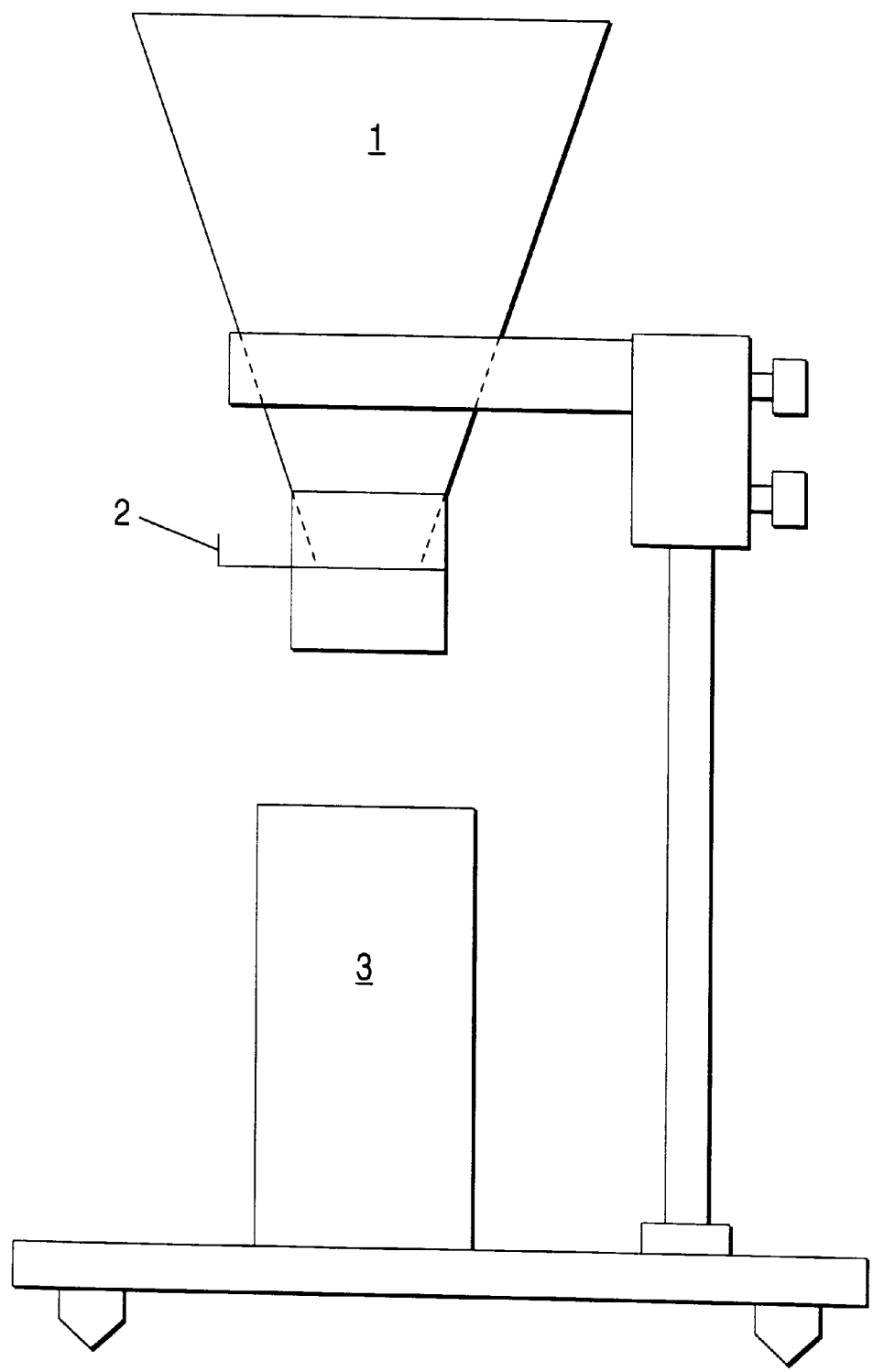
FIG. 1 is a schematic diagram illustrating an apparatus used in the measurement of flowability of the copolymers according to examples.

The present invention will be further described in the following examples and comparative examples.

For the measurement of the pore volume and pore distribution of an alkoxymagnesium, a Type QS-17 Quantasobe available from Yuasa Ionics Co., Ltd. was used. The measurement was carried out by a nitrogen gas adsorption isotherm method.

EXAMPLE 1

Preparation of Solid Catalyst Component (A)

Into a 500-ml round flask equipped with an agitator in which the air within had been thoroughly replaced by nitrogen gas were charged 30 ml of titanium tetrachloride and 20 ml of toluene to form a mixed solution. To the mixed solution which had been kept at a temperature of 10° C. was then added a suspension prepared from 10 g of a diethoxymagnesium having a bulk density of 0.29 g/m as determined by JIS K6721 (hereinafter the same), a specific surface area ($N_2SA$) of 19.8 $m^2$/g, a sphericity (l/w) of 1.10, an average particle size of 32 μm, a pore volume of 0.039 ml/g, a pore distribution [in ($R_{90}/R_{10}$)] of 2.30, a fine powder having a particle size of not more than 5 μm in an amount of 5% and a particle size distribution [$(D_{90}-D_{10})/D_{50}$] of 1.05, 50 ml of toluene and 3.6 ml of di-n-butyl phthalate. The mixed solution was heated from 10° C. to 90° C. in 80 minutes. The mixed solution was then allowed to undergo reaction with stirring for 2 hours. After the termination of the reaction, the resulting solid reaction product was washed with 100 ml of toluene four times at a temperature of 90° C. To the resulting reaction product were then added 30 ml of titanium tetrachloride and 70 ml of toluene. The mixture was heated to a temperature of 112° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 2.67% by weight.

Preparation of Polymerization Catalyst and Polymerization

Into a 2 l autoclave equipped with an agitator in which the air within had been completely replaced by nitrogen gas were charged 1.32 mmol of triethylaluminum, 0.13 mmol of cyclohexylmethyldimethoxysilane and the foregoing solid catalyst component in an amount of 0.0033 mmol as calculated in terms of titanium atom to form a polymerization catalyst. Into the autoclave were then charged 1.5 l of hydrogen gas and 1.4 l of liquid propylene. The mixture was then allowed to undergo polymerization reaction at a temperature of 70° C. for 1 hour to obtain a polymer. The capacities of the catalyst thus obtained by the polymerization and the particle properties of the polymer obtained such as MI, bulk density, average particle size, sphericity (l/w), wt % of fine powder having a particle size of not more than 105 μm as an index of content of fine powder, particle size distribution [$(D_{90}-D_{10})/D_{50}$] and melting point (° C.) are set forth in Table 1.

The capacities of the catalyst had been determined as follows. In some detail, after the termination of the polymerization reaction, the polymer thus produced was measured for weight W. The polymer was then extracted with boiling n-heptane for 6 hours. The resulting undissolved polymer was then measured for weight w. The polymerization activity and the yield of the entire crystalline polymer were determined by the following equations: [(W)/Solid catalyst component (g)] and [(w/W)×100], respectively.

EXAMPLE 2

Preparation of Solid Catalyst Component (A)

Into a 500-ml round flask equipped with an agitator in which the air within had been thoroughly replaced by nitrogen gas were charged 30 ml of titanium tetrachloride and 20 ml of toluene to form a mixed solution. To the mixed solution which had been kept at a temperature of 10° C. was then added a suspension prepared from 10 g of the same diethoxymagnesium as used in Example 1 and 50 ml of toluene. To the mixed solution which had been kept at the same temperature was then added 3.6 ml of di-n-butyl phthalate. The mixed solution was heated from 10° C. to 90° C. in 80 minutes. The mixed solution was then allowed to undergo reaction with stirring for 2 hours. After the termination of the reaction, the resulting solid reaction product was washed with 100 ml of toluene four times at a temperature of 90° C. To the resulting reaction product were then added 30 ml of titanium tetrachloride and 70 ml of toluene. The mixture was heated to a temperature of 112° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 2.20% by weight.

Preparation of Polymerization Catalyst and Polymerization

The procedure of preparation of catalyst and polymerization test of Example 1 was followed except that the solid catalyst component prepared in the foregoing example was used. The results are set forth in Table 1.

EXAMPLE 3

The experiment procedure of Example 2 was followed except that the polymerization was effected in the presence of a polymerization catalyst obtained from cyclohexylcyclopentyldimethoxysilane instead of cyclohexylmethyldimethoxysilane. The results are set forth in Table 1.

EXAMPLE 4

Preparation of Solid Catalyst Component (A)

Into a 500-ml round flask equipped with an agitator in which the air within had been thoroughly replaced by nitrogen gas were charged 30 ml of titanium tetrachloride and 20 ml of toluene to form a mixed solution. To the mixed solution which had been kept at a temperature of 10° C. was then added a suspension prepared from 10 g of the same diethoxymagnesium as used in Example 1 and 50 ml of toluene. To the mixed solution which had been kept at the temperature of 10° C. were then added 1.1 ml of di-n-butyl phthalate and 1.8 ml of diisooctyl phthalate (bis(2-ethylhexyl) phthalate). The mixed solution was heated from 10° C. to 85° C. in 75 minutes. To the mixed solution was then added 0.7 ml of diethyl phthalate at a liquid temperature of 85° C. The mixed solution was heated to a temperature of 100° C. where it was then reacted with stirring for 2 hours. After the termination of the reaction, the resulting solid reaction product was washed with 100 ml of toluene of 80° C. four times. To the resulting reaction product were then added 30 ml of titanium tetrachloride and 70 ml of toluene. The mixture was heated to a temperature of 112° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 2.23% by weight.

Preparation of Polymerization Catalyst and Polymerization

The procedure of preparation of catalyst and polymerization test of Example 1 was followed except that the solid catalyst component prepared in the foregoing example was used. The results are set forth in Table 2.

EXAMPLE 5

The experiment procedure of Example 4 was followed except that a polymerization catalyst was obtained from dicyclopentyldimethoxysilane instead of cyclohexylmethyldimethoxysilane. The results are set forth in Table 2.

EXAMPLE 6

The experiment procedure of Example 4 was followed except that a polymerization catalyst was obtained from cyclohexylcyclopentyldimethoxysilane instead of cyclohexylmethyldimethoxysilane. The results are set forth in Table 2.

EXAMPLE 7

Preparation of Solid Catalyst Component (A)

Into a 500-ml round flask equipped with an agitator in which the air within had been thoroughly replaced by nitrogen gas were charged 30 ml of titanium tetrachloride and 20 ml of toluene to form a mixed solution. To the mixed solution which had been kept at a temperature of 10° C. was then added a suspension prepared from 10 g of the same diethoxymagnesium as used in Example 1 and 50 ml of toluene. To the mixed solution which had been kept at the temperature of 10° C. were then added 1.0 ml of di-n-butyl phthalate. The mixed solution was heated from 10° C. to 85° C. in 75 minutes. To the mixed solution was then added 4.0 ml of di-n-butyl phthalate at a liquid temperature of 85° C. The mixed solution was heated to a temperature of 112° C. where it was then reacted with stirring for 2 hours. After the termination of the reaction, the resulting solid reaction product was washed with 100 ml of toluene of 80° C. four times. To the resulting reaction product were then added 30 ml of titanium tetrachloride and 70 ml of toluene. To the mixture was 1 ml of diethyl phthalate. The mixture was heated to a temperature of 112° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 3.20% by weight.

Preparation of Polymerization Catalyst and Polymerization

The procedure of polymerization experiment of Example 1 was followed except that the solid catalyst component prepared in the foregoing example was used and dicyclopentyldimethoxysilane was used instead of cyclohexylmethyldimethoxysilane. The results are set forth in Table 2.

EXAMPLE 8

Preparation of Solid Catalyst Component (A)

Into a 500-ml round flask equipped with an agitator in which the air within had been thoroughly replaced by nitrogen gas were charged 20 ml of titanium tetrachloride and 30 ml of toluene to form a mixed solution. To the mixed solution which had been kept at a temperature of 10° C. was then added a suspension prepared from 10 g of the same diethoxymagnesium as used in Example 1 and 50 ml of toluene. To the mixed solution which had been kept at the temperature of 10° C. was then added 3.6 ml of diisooctyl phthalate (bis(2-ethylhexyl) phthalate). The mixed solution was heated from 10° C. to 110° C. in 100 minutes. The mixed solution was then reacted with stirring for 2 hours. After the termination of the reaction, the resulting reaction product was washed with 100 ml of toluene of 80° C. four times. To the resulting reaction product were then added 40 ml of titanium tetrachloride and 60 ml of toluene. The mixture was heated to a temperature of 110° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 3.11% by weight.

Preparation of Polymerization Catalyst and Polymerization

The procedure of experiment of Example 1 was followed except that the solid catalyst component prepared in the foregoing example was used. The results are set forth in Table 2.

EXAMPLE 9

The procedure of experiment of Example 2 was followed except that a diethoxymagnesium having a bulk density of 0.25 g/ml, a pore volume of 0.044 ml/g, a pore distribution [ln $(R_{90}/R_{10})$] of 2.53, a specific surface area of 23.8 m$^2$/g, a sphericity (l/w) of 1.07, an average particle size of 30 μm, a fine powder having a particle size of not more than 5 μm in an amount of 6% and a particle size distribution [$(D_{90}-D_{10})/D_{50}$] of 1.10 was used to prepare a solid catalyst component. The solid catalyst component thus obtained had a titanium content of 2.25% by weight. The results are set forth in Table 3.

COMPARATIVE EXAMPLE 1

Preparation of Solid Catalyst Component (A)

Into a 200-ml round flask equipped with an agitator in which the air within had been thoroughly replaced by nitrogen gas were charged 30 mg of titanium tetrachloride and 20 ml of toluene to form a mixed solution. To the mixed solution which had been kept at a temperature of 10° C. was then added a suspension prepared from 10 g of a diethoxymagnesium having a bulk density of 0.21 g/ml, a pore volume of 0.055 ml/g, a pore distribution [in $(R_{90}/R_{10})$] of 3.30, a specific surface area of 17.7 m$^2$/g, a sphericity (l/w) of 1.15, an average particle size of 28 μm, a fine powder having a particle size of not more than 5 μm in an amount of 5% and a particle size distribution [$(D_{90}-D_{10})/D_{50}$] of 1.08, 50 ml of toluene and 3.6 ml of di-n-butyl phthalate. The mixed solution was heated from 10° C. to 90° C. in 200 minutes. The mixed solution was then allowed to undergo reaction with stirring for 3 hours. After the termination of the reaction, the resulting solid reaction product was washed with 100 ml of toluene of 90° C. three times. To the resulting reaction product were then added 30 ml of titanium tetrachloride and 70 ml of toluene. The mixture was heated to a temperature of 100° C. where it was then reacted with stirring for 2 hours. After the termination of the reaction, the resulting reaction product was washed with 100 ml of n-heptane of 40° C. 10 times to obtain a solid catalyst component. The solid catalyst component thus obtained was then measured for titanium content. The results were 2.62% by weight.

Preparation of Polymerization Catalyst and Polymerization

The procedure of catalyst preparation and polymerization experiment of Example 1 was followed except that the solid catalyst component thus prepared was used. The results are set forth in Table 3.

COMPARATIVE EXAMPLE 2

The experiment procedure of Example 2 was followed except that the same diethoxymagnesium as used in Comparative Example 1 was used. The solid catalyst component thus prepared was measured for titanium content. The results were 2.53% by weight. The results are set forth in Table 3.

COMPARATIVE EXAMPLE 3

Preparation of Solid Catalyst Component

Into a 500-ml round flask equipped with an agitator in which the air within had been thoroughly replaced by nitrogen gas was charged 80 ml of toluene. Into the flask were then charged 10 g of a diethoxymagnesium having a bulk density of 0.41 g/ml as determined by JIS K6721, a pore volume of 0.010 ml/g, a pore distribution [ln $(R_{90}/R_{10})$] of 2.63, a specific surface area (N$_2$SA) of 9.8 m$^2$/g, a sphericity (l/w) of 2.0, an average particle size of 101.9 μm, a fine powder having a particle size of not more than 5 μm in an amount of 4.1% and a particle size distribution [$(D_{90}-D_{10})/D_{50}$] of 2.44 to form a suspension. To the suspension was then added 20 ml of titanium tetrachloride at a temperature of 10° C. with stirring. The suspension was heated from 10° C. to 90° C. in 80 minutes. To the suspension was then added 2.7 ml of di-n-butyl phthalate. Thereafter, the suspension was heated to 110° C. where it was then reacted with stirring for 2 hours. After the termination of the reaction, the resulting solid reaction product was washed with 100 ml of toluene of 90° C. three times. To the reaction product were then added 20 ml of titanium tetrachloride and 80 ml of toluene. The mixture was heated to 110° C. where it was then reacted with stirring for 2 hours. After the termination of the reaction, the reaction product was washed with 100 ml of n-heptane of 40° C. 10 times to obtain a solid catalyst component. The solid catalyst component was measured for titanium content. The results were 2.85% by weight.

Preparation of Polymerization Catalyst and Polymerization

The procedure of catalyst preparation and polymerization experiment of Example 1 was followed except that the solid catalyst component thus prepared was used. The results are set forth in Table 3.

EXAMPLE 10

Preparation of Solid Catalyst Component (A)

A solid catalyst component was prepared in the same manner as in Example 2.

Preparation of Polymerization Catalyst and Block Copolymerization of Propylene and Ethylene Into a 2 l autoclave equipped with an agitator in which the air within had been thoroughly replaced by nitrogen gas were charged 1.51 mmol of triethylaluminum, 0.151 mmol of cyclohexylmethyldimethoxysilane and the foregoing solid catalyst component in an amount of 0.0030 mmol as calculated in terms of titanium atom to form a polymerization catalyst. Thereafter, into the autoclave were charged 6.5 l of hydrogen gas and 700 ml of liquid propylene. The mixture was subjected to prepolymerization at a temperature of 20° C. for 5 minutes, and then heated to a temperature of 70° C. where it was then allowed to undergo polymerization reaction for 20 minutes (1st stage polymerization). After the termination of the 1st stage polymerization, the unreacted propylene was purged from the autoclave and replaced by nitrogen gas. The resulting reaction product was heated to 65° C. where it was then subjected to polymerization with the supply of a 1:1 mixture of propylene and ethylene in the form of gas at a rate of 1.2 l per minute for 1 hour (2nd stage polymerization). The capacities of the catalyst thus obtained and the properties, ethylene content, ethylene propylene content (EPR) and flowability of the polymer thus obtained are set forth in Table 4.

For the determination of the ethylene content in the copolymer, $^{13}C$-NMR was employed. For the measurement of the ethylene propylene rubber (EPR) content in the copolymer, the following method was employed. In some detail, into a 1 l flask equipped with an agitator and a condenser were charged about 2.5 g of the copolymer, 8 mg of 2,6-di-t-butyl-p-cresol and 250 ml of p-xylene. The mixture was then stirred at the boiling point thereof until the copolymer was completely dissolved. The flask was cooled to room temperature where it was then allowed to stand for 15 hours so that solid matter was precipitated. The resulting reaction product was then subjected to centrifugal separation by a centrifugal separator to separate the solid matter from the liquid phase. The solid matter thus separated was then withdrawn into a beaker. Into the beaker was then poured 500 ml of acetone. The mixture was then stirred at room temperature for 15 hours. The solid matter was withdrawn by filtration, dried, and then measured for weight (weight A). The liquid phase thus separated was subjected to the same treatment to obtain a solid matter which was then measured for weight (weight B). The content (% by weight) of ethylene propylene rubber content (EPR) in the copolymer was calculated by the equation: $[B(g)/[A(g)+B(g)] \times 100]$.

For the evaluation of the flowability of the copolymer, the following method was employed. An apparatus comprising a funnel 1 (upper aperture: 91 mm; aperture at the damper position: 8 mm; angle of inclination: 20°; height at the damper position: 114 mm) provided at the upper portion thereof with a damper 2 provided at the outlet thereof, and a container-like receiver 3 (inner diameter: 40 mm; height: 81 mm) provided 38 mm below the damper 2 as shown in FIG. 1 was employed. In operation, 50 g of the polymer was poured into the funnel 1. The damper 2 was then opened to allow the polymer to drop onto the receiver 3. The time required until the drop of the total amount of the polymer was finished was measured. This operation was effected for the copolymer to be tested and a propylene homopolymer prepared in the same solid catalyst component as used in the preparation of the copolymer (polymer obtained in Example 2). The dropping time of the copolymer and the homopolymer were $T_1$ and $T_2$, respectively. The flowability of the copolymer was determined by $T_1/T_2$.

EXAMPLE 11

The experiment procedure of Example 10 was followed except that the 2nd stage polymerization was effected for 3 hours. The results are set forth in Table 4.

COMPARATIVE EXAMPLE 4

The experiment procedure of Example 10 was followed except that the solid catalyst component prepared in Comparative Example 1 was used and the 2nd stage polymerization was effected for 2 hours. The results are set forth in Table 4. As the propylene homopolymer to be used for the evaluation of flowability there was used the polymer obtained in Comparative Example 1.

COMPARATIVE EXAMPLE 5

The experiment procedure of Example 10 was followed except that the solid catalyst component prepared in Comparative Example 3 was used and the 2nd stage polymerization was effected for 2 hours. The results are set forth in Table 4. As the propylene homopolymer to be used for the evaluation of flowability there was used the polymer obtained in Comparative Example 3.

TABLE 1

|  | Example 1 | Example 2 | Example 3 |
| --- | --- | --- | --- |
| Weight (a) of produced polymer (g) | 367 | 430 | 522 |
| Weight (b) of polymer insoluble in boiling n-heptane (g) | 363 | 424 | 509 |
| Polymerization activity (g/g-cat.) | 62,000 | 59,900 | 72,700 |
| % Yield of entire crystalline polymer | 98.9 | 98.6 | 97.6 |
| MI (g/10 min.) | 2.9 | 4.2 | 9.4 |
| Bulk density (g/ml) | 0.45 | 0.47 | 0.45 |
| Average particle size (μm) | 1,200 | 960 | 1,180 |
| Sphericity (1/w) | 1.10 | 1.08 | 1.09 |
| Not more than 105 μm (%) | 4.5 | 4.0 | 3.5 |
| Particle size distribution $(D_{90} - D_{10})/D_{50}$ | 1.06 | 1.28 | 1.14 |

TABLE 2

|  | Example 4 | Example 5 | Example 6 | Example 7 | Example 8 |
| --- | --- | --- | --- | --- | --- |
| Weight (a) of produced polymer (g) | 443 | 345 | 452 | 375 | 330 |
| Weight (b) of polymer insoluble in boiling n-heptane (g) | 438 | 341 | 446 | 369 | 322 |
| Polymerization activity (g/g-cat.) | 62,600 | 48,700 | 63,900 | 76,000 | 65,000 |
| % Yield of entire crystalline polymer | 98.7 | 98.7 | 98.6 | 98.6 | 97.5 |
| MI (g/10 min.) | 5.1 | 4.5 | 2.1 | 7.6 | 5.0 |
| Bulk density (g/ml) | 0.43 | 0.43 | 0.43 | 0.44 | 0.43 |
| Average particle | 1,150 | 1,100 | 1,050 | 1,300 | 920 |

TABLE 2-continued

|  | Example 4 | Example 5 | Example 6 | Example 7 | Example 8 |
|---|---|---|---|---|---|
| size ($\mu$m) |  |  |  |  |  |
| Sphericity (l/w) | 1.11 | 1.10 | 1.12 | 1.10 | 1.08 |
| Not more than 105 $\mu$m (%) | 1.0 | 1.0 | 1.2 | 1.6 | 0.4 |
| Particle size distribution ($D_{90} - D_{10}$)/$D_{50}$ | 1.05 | 1.10 | 1.20 | 1.38 | 1.27 |
| Melting point (°C.) | 162.0 | 164.0 | 163.4 | 163.8 | 160.7 |

TABLE 3

|  | Example 9 | Comparative Example 1 | Comparative Example 2 | Comparative Example 3 |
|---|---|---|---|---|
| Weight (a) of produced polymer (g) | 432 | 350 | 353 | 337 |
| Weight (b) of polymer insoluble in boiling n-heptane (g) | 426 | 344 | 348 | 332 |
| Polymerization activity (g/g-cat.) | 61,500 | 58,000 | 56,500 | 60,800 |
| % Yield of entire crystalline polymer | 98.7 | 98.5 | 98.7 | 98.6 |
| MI (g/10 min.) | 3.9 | 6.0 | 2.9 | 4.5 |
| Bulk density (g/ml) | 0.44 | 0.36 | 0.38 | 0.40 |
| Average particle size ($\mu$m) | 950 | 800 | 840 | 550 |
| Sphericity (l/w) | 1.12 | 1.22 | 1.21 | 2.1 |
| Not more than 105 $\mu$m (%) | 3.9 | 6.0 | 6.1 | 15.0 |
| Particle size distribution ($D_{90} - D_{10}$)/$D_{50}$ | 1.12 | 1.64 | 1.54 | 2.84 |

TABLE 4

|  | Example 10 | Example 11 | Comparative Example 4 | Comparative Example 5 |
|---|---|---|---|---|
| Weight (a) of produced polymer (g) | 187 | 244 | 124 | 138 |
| Polymerization activity (g/g-cat.) | 28,500 | 37,100 | 18,800 | 27,300 |

TABLE 4-continued

|  | Example 10 | Example 11 | Comparative Example 4 | Comparative Example 5 |
|---|---|---|---|---|
| MI (g/10 min.) | 13.0 | 3.7 | 13.0 | 11.5 |
| Bulk density (g/ml) | 0.42 | 0.44 | 0.37 | 0.36 |
| Average particle size ($\mu$m) | 1,080 | 1,200 | 900 | 530 |
| Sphericity (l/w) | 1.09 | 1.10 | 1.20 | 1.9 |
| Not more than 105 $\mu$m (%) | 0.6 | 0.7 | 1.3 | 13.0 |
| Particle size distribution ($D_{90} - D_{10}$)/$D_{50}$ | 0.69 | 0.67 | 0.93 | 2.50 |
| Ethylene content (wt %) | 5.5 | 15.3 | 5.0 | 6.5 |
| EPR content (wt %) | 8.7 | 23.6 | 8.3 | 8.0 |
| Flowability ($T_1/T_2$) | 0.92 | 0.92 | 0.81 | 0.68 |

As can be seen in Tables 1 to 4, the polymerization of olefins in the presence of a catalyst prepared from the solid catalyst component (A) prepared in the examples satisfying the requirements of the present invention, an organic aluminum compound (B) and a specific organic silicon compound (C) makes it possible to obtain a polymer having a high stereoregularity at a high polymerization activity in a high yield. Further, the polymers thus produced exhibit remarkable improvements in particle properties such as bulk density, average particle size, sphericity, fine powder content and particle size distribution as compared with the comparative examples. As can be seen in Examples 10 and 11 and Comparative Examples 4 and 5 (table 4), the use of the solid catalyst component and catalyst of the present invention in the copolymerization of ethylene and propylene makes it possible to maintain the desired excellent particle properties even if the production ratio of rubber-like copolymer is raised. For example, the flowability of the polymer can be obviously enhanced.

Industrial Applicability

As mentioned above, the use of the catalyst component and catalyst for polymerization of olefins provided according to the present invention makes it possible to obtain an olefin polymer which invariably exhibits a high stereoregularity, excellent particle properties and a high bulk density. Further, a copolymer having excellent particle properties can be efficiently obtained even if the production ratio of rubber-like polymer is raised in the block copolymer. Thus, the present invention makes a great industrial contribution.

We claim:

1. A solid catalyst component for polymerization of olefins, prepared by allowing the following components (a), (b) and (c) to come in contact and react with one another:
    (a) a dialkoxymagnesium in powder form having a bulk density of from 0.25 to 0.40 g/ml and an average particle size of from 1 to 100 $\mu$m;

(b) a titanium halide represented by the general formula: Ti(OR$^1$)$_n$X$_{4-n}$, wherein R$^1$ represents a C$_{1-4}$-alkyl group, X represents a chlorine, bromine or iodine atom, and n represents 0 or an integer of from 1 to 3; and (c) a diester of an aromatic dicarboxylic acid;
wherein the average rate of heat rise from the temperature at which the component (b) is allowed to come in contact with the component (a) to the temperature at which their reaction is initiated is in a range of from 0.5 to 20° C./min.

2. A The solid catalyst component for polymerization of olefins according to claim 1, wherein said dialkoxymagnesium as component (a) has a pore volume of at least 0.02 ml/g.

3. The solid catalyst component for polymerization of olefins according to claim 1, wherein said dialkoxymagnesium as component (a) has a pore volume of from 0.02 to 0.06 ml/g.

4. The solid catalyst component for polymerization of olefins according to claim 1, wherein said dialkoxymagnesium as component (a) has a pore volume distribution of from 1.5 to 3.5.

5. The solid catalyst component for polymerization of olefins according to claim 1, wherein said dialkoxymagnesium as component (a) has a specific surface area of from 5 to 50 m$^2$/g.

6. The solid catalyst component for polymerization of olefins according to claim 1, wherein said dialkoxymagnesium as component (a) is shaped such that the sphericity coefficient of the particle is not more than 3 as calculated in terms of ratio of major axis length l to minor axis length w (l/w).

7. The solid catalyst component for polymerization of olefins according to claim 1, wherein said dialkoxymagnesium as component (a) comprises particles having a particle size of not more than 5 µm in a proportion of nor more than 20% by weight and particles having a particle size of at least 100 µm in a proportion of not more than 10% by weight.

8. The solid catalyst component for polymerization of olefins according to claim 1, wherein said dialkoxymagnesium as component (a) has a particle size distribution of not more than 3.

9. The solid catalyst component for polymerization of olefins according to claim 1, wherein said components (a), (b) and (c) are allowed to come in contact with one another in a suspension of aromatic hydrocarbon liquid at room temperature.

10. The solid catalyst component for polymerization of olefins according to claim 1, wherein the temperature at which the component (b) is allowed to come in contact with the component (a) is not higher than 40° C. and the temperature at which their reaction is initiated is not less than 70° C.

11. The solid catalyst component for polymerization of olefins according to claim 1, wherein said dialkoxymagnesium as component (a) is a dialkoxymagnesium prepared by the steps of (i) continuously or intermittently adding metallic magnesium and an alcohol to a reaction composition under reflux of said alcohol so that they are reacted, and (ii) keeping the resulting reaction product under reflux of said alcohol for 1 to 30 hours, in the presence of a catalyst.

12. A catalyst for polymerization of olefins, prepared from the following components (A), (B) and (C):

(A) a solid catalyst component for polymerization of olefins as defined in claim 1, (B) one or more organic aluminum compounds represented by the general formula:

R$^2$$_x$AlQ$_{3-x}$ wherein R$^2$ represents a C$_{1-4}$-alkyl group, Q represents a hydrogen, chlorine, bromine or iodine atom; and x represents a real number of more than 0 to not more than 3; and (C) one or more organic silicon compounds represented by the general formula:

R$^3$$_y$Si(OR$^4$)$_{4-y}$ wherein R$^3$, which may be the same or different, each represents an alkyl group, a cycloalkyl group, a phenyl group, a vinyl group, an allyl group or an aralkyl group; R$^4$, which may be the same or different, each represents a C$_{1-4}$-alkyl group, a cycloalkyl group, a phenyl group, a vinyl group, an allyl group or an aralkyl group, and y represents 0 or an integer of from 1 to 3.

13. The catalyst for polymerization of olefins according to claim 12, wherein the cycloalkyl group for R$^3$ represents a cyclopentyl group, a cyclohexyl group, a 3-methcyclohexyl group, a 4-methylcyclohexyl group, or a 3,5-dimethylcyclohexyl group.

14. A solid catalyst component for polymerization of olefins, prepared by allowing the following components (a), (b) and (c) to come in contact and react with one another:

(a) a dialkoxymagnesium in powder form having a bulk density of from 0.25 to 0.40 g/ml and an average particle size of from 1 to 100 µm, said dialkoxymagnesium being prepared by the steps of (i) continuously or intermittently adding metallic magnesium and an alcohol to a reaction composition under reflux of said alcohol so that they are reacted, and (ii) keeping the resulting reaction product under reflux of said alcohol for 1 to 30 hours, in the presence of a catalyst;

(b) a titanium halide represented by the general formula: Ti(OR$^1$)$_n$X$_{4-n}$, wherein R$^1$ represents a C$_{1-4}$-alkyl group, X represents a chlorine, bromine or iodine atom, and n represents 0 or an integer of from 1 to 3; and (c) a diester of an aromatic dicarboxylic acid.

15. A catalyst for polymerization of olefins, prepared from the following components (A), (B) and (C):

(A) a solid catalyst component for polymerization of olefins as defined in claim 14;

(B) one or more organic aluminum compounds represented by the general formula:

R$^2$$_x$AlQ$_{3-x}$ wherein R$^2$ represents a C$_{1-4}$-alkyl group, Q represents a hydrogen, chlorine, bromine or iodine atom; and x represents a real number of more than 0 to not more than 3; and (C) one or more organic silicon compounds represented by the general formula:

R$^3$$_y$Si(OR$^4$)$_{4-y}$ wherein R$^3$, which may be the same or different, each represents an alkyl group, a cycloalkyl group, a phenyl group, a vinyl group, an allyl group or an aralkyl group; R$^4$, which may be the same or different, each represents a C$_{1-4}$-alkyl group, a cycloalkyl group, a phenyl group, a vinyl group, an allyl group or an aralkyl group, and y represents 0 or an integer of from 1 to 3.

16. The catalyst for polymerization of olefins according to claim 15, wherein the cycloalkyl group for R$^3$ represents a cyclopentyl group, a cyclohexyl group, a 3-methylcyclohexyl group, a 4-methylcyclohexyl group, or a 3,5-dimethylcyclohexyl group.

* * * * *